United States Patent
Wiant et al.

(10) Patent No.: US 9,549,306 B2
(45) Date of Patent: Jan. 17, 2017

(54) USAGE TRIGGERED TELECOMMUNICATIONS CHARGING

(71) Applicant: Oracle International Corporation, Redwood Shores, CA (US)

(72) Inventors: Helen N. Wiant, Cupertino, CA (US); Debdulal Dey, San Ramon, CA (US); Gireesh Malaksamudra, Sunnyvale, CA (US); Richard Beaumont Tasker, Los Altos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/512,773

(22) Filed: Oct. 13, 2014

(65) Prior Publication Data

US 2016/0105785 A1     Apr. 14, 2016

(51) Int. Cl.
| | |
|---|---|
| H04M 11/00 | (2006.01) |
| H04W 4/24 | (2009.01) |
| H04M 15/00 | (2006.01) |
| H04L 12/14 | (2006.01) |
| H04M 17/02 | (2006.01) |

(52) U.S. Cl.
CPC ............ *H04W 4/24* (2013.01); *H04L 12/1407* (2013.01); *H04M 15/60* (2013.01); *H04M 15/64* (2013.01); *H04M 15/66* (2013.01); *H04M 17/02* (2013.01)

(58) Field of Classification Search
CPC ... H04L 12/1407; H04M 15/66; H04M 15/64; H04W 4/24; H04W 4/26
See application file for complete search history.

(56) References Cited

U.S. PATENT DOCUMENTS

| | | | |
|---|---|---|---|
| 7,167,699 B1 | 1/2007 | Kretsinger | |
| 7,717,334 B1 | 5/2010 | Rolf | |
| 8,634,407 B2 | 1/2014 | Mohammed et al. | |
| 2011/0003579 A1 | 1/2011 | Cai et al. | |
| 2011/0066530 A1 | 3/2011 | Cai et al. | |
| 2011/0161216 A1* | 6/2011 | Ahlgren | G06Q 20/102 705/34 |
| 2011/0161248 A1* | 6/2011 | Cai | G06Q 30/0283 705/400 |
| 2011/0270722 A1 | 11/2011 | Cai et al. | |
| 2012/0330769 A1* | 12/2012 | Arceo | G06Q 20/4014 705/21 |

(Continued)

OTHER PUBLICATIONS

Oracle Data Sheet; Oracle Communications; "Oracle Communications Network Charging and Control"; 2012.

(Continued)

*Primary Examiner* — Khalid Shaheed
(74) *Attorney, Agent, or Firm* — Miles & Stockbridge, PC

(57) ABSTRACT

An Online Charging System ("OCS") that processes charging on a telecommunications network receives an indication of usage of a telecommunications service by a subscriber. In response to the indication, the OCS determines a configured offering for the service, where the configured offering includes a time period, and a credit and/or debit. The OCS determines if the usage of the service is a first usage within the time period, and when the usage is the first usage, applies the credit and/or debit. The OCS then determines a charge for the usage based on credit and/or debit.

17 Claims, 6 Drawing Sheets

(56) References Cited

U.S. PATENT DOCUMENTS

| | | | |
|---|---|---|---|
| 2013/0231080 A1* | 9/2013 | Cheuk | H04M 15/765 |
| | | | 455/405 |
| 2014/0040975 A1* | 2/2014 | Raleigh | H04W 12/12 |
| | | | 726/1 |
| 2014/0082170 A1 | 3/2014 | Kaemmerer et al. | |
| 2014/0187199 A1* | 7/2014 | Yan | H04W 48/02 |
| | | | 455/410 |

OTHER PUBLICATIONS

Oracle Communications; "Oracle Communications Billing and Revenue Management Product Overview"; on Oracle White Paper; May 2012.

Oracle Data Sheet; Oracle Communications; "Oracle Communications Elastic Charging Engine"; 2012.

S. Gioia et al.; "Understanding the IMS Charging Architecture"; Jul. 25, 2007; http://www.oracle.com/technetwork/articles/grid/imc-charging-architecture-085533.html.

Digital cellular telecommunications system (Phase 2+); Universal Mobile Telecommunications System (UMTS); LTE; Telecommunication management; Charging management; Online Charging System (OCS): Applications and Interfaces; 3GPP TS 32.296 version 11.5.0 Release 11 ; ETSI TS 132 296 V11.5.0; Apr. 2013; pp. 1-29.

Oracle Data Sheet; Oracle Communications; "Oracle Communications Billing and Revenue Management"; 2012.

\* cited by examiner

- Charge a fixed amount of $5.00 per day for unlimited usage
- Charge is applied when first usage happens in a day
  - Unlimited usage thereafter
  - No charge on a day when there is no usage

USAGE TRIGGERED TELECOMMUNICATIONS CHARGING

FIELD

One embodiment is directed generally to telecommunications, and in particular to online charging for telecommunications.

BACKGROUND INFORMATION

Service providers/operators typically provide numerous voice and/or data services to subscribers using wireline and/or wireless communications networks. Examples of such services include cellular telephony, access to the Internet, gaming, broadcasting or multicasting of audio, video, and multimedia programming, etc. User equipment such as cell phones, personal data assistants, smart phones, text messaging devices, global positioning system ("GPS") devices, network interface cards, notebook computers, and desktop computers, may access the services provided by the communications networks over an air interface with one or more base stations.

Operators or "service providers" use offline and online charging functions to keep track of the charges incurred by each device for using the various services. The $3^{rd}$ Generation Partnership Project ("3GPP"/"3GPP2") standards groups have defined a set of specifications that may be used to implement online charging systems and offline charging systems to cover charging in the various network domains (e.g., a circuit switching network domain, a packet switching network domain, and/or a wireless domain), IP multimedia subsystems ("IMS"), and emerging 3G/OMA application services.

Subscribers of telecommunications services, such as cellular voice and data subscriptions, typically pay a monthly fee for services that often include allowances. For example, a monthly allowance for a number of minutes, a number of Short Message Service ("SMS") texts, gigabytes of data, etc. However, service providers, particularly in the telecommunications domain, are increasingly interested in offering subscription periods that are significantly shorter than a month in order to better manage subscriber spending patterns and to address a customer segment that might not be able to afford paying a month at a time.

SUMMARY

One embodiment is an Online Charging System ("OCS") that processes charging on a telecommunications network. The OCS receives an indication of usage of a telecommunications service by a subscriber. In response to the indication, the OCS determines a configured offering for the service, where the configured offering includes a time period, and a credit and/or debit. The OCS determines if the usage of the service is a first usage within the time period, and when the usage is the first usage, applies the credit and/or debit. The OCS then determines a charge for the usage based on credit and/or debit.

BRIEF DESCRIPTION OF THE DRAWINGS

FIG. 6 illustrates an example user interface for charging a fixed amount of for unlimited usage in accordance with one embodiment.

DETAILED DESCRIPTION

One embodiment is an online charging system that supports allowances without dependency on a subscription system such as a Billing and Revenue Management System. The allowances are triggered by a subscriber's use of the service rather than by the subscription system, and the time period for granting allowances is flexible.

Figure 1:
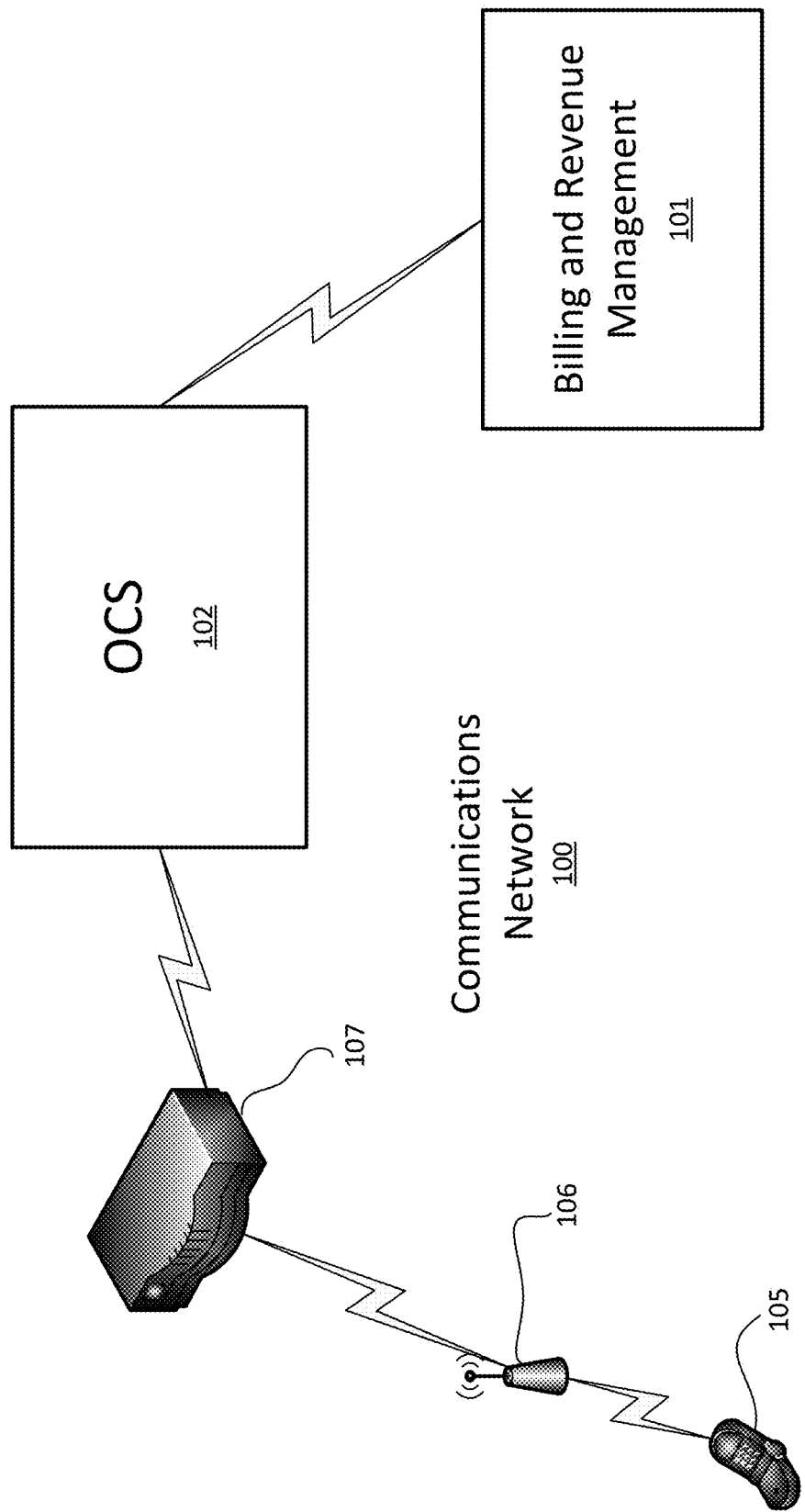
FIG. 1 is an overview diagram of a communications network including network elements that implement embodiments of the present invention and/or interact with embodiments of the present invention.

FIG. 1 is an overview diagram of a communications network 100 including network elements that implement embodiments of the present invention and/or interact with embodiments of the present invention. Network 100 includes an Online Charging System ("OCS") 102 that in general is a runtime engine that provides online charging for a communications session. OCS 102 is coupled to Billing and Revenue Management System ("BRM") 101 (also referred to as the "subscription system"). BRM stores information for each registered user/customer of network 100, and for each customer determines charging parameters such as usage rates, bundles of available minutes and promotions, current balances, allowances, etc.

A user will interface with network 100 through user equipment ("UE") 105. UE 105 can be any type of device that allows a user to participate in a communications session using data transmission that may represent a voice call, a video presentation, a Short Message Service ("SMS"), etc. Network 100 can include many different types of network elements that connect UE 105 to network 100, including a cellular tower 106, a router 107, and other known devices not shown in FIG. 1.

Online charging through OCS 102 refers to a charging mechanism where charging information can affect, in real-time, the service rendered. Therefore, a direct interaction of the charging mechanism with session/service control, provided by BRM 101, is needed. In online charging, charging information for network resource usage is collected concurrently with the resource usage. However, authorization for the network resource usage must be obtained by the network via BRM 101 prior to the actual resource usage based on the charging results returned by OCS 102. The charging decisions in OCS 102 are made based on the allowable resources for a user that are obtained from BRM 101 and maintained in OCS 102.

In one embodiment, network 100 is an IMS network in accordance with the 3GPP standards. As opposed to post-paid charging, where the services are provided first and the IMS user is billed later, OCS 102 provides pre-paid charging, where the IMS user has to have an account balance prior to services being provided, and the account balance is debited as the services are provided.

In one embodiment, OCS 102 includes an online charging function, an account balance management function ("ABMF"), and a rating function ("RF"). The ABMF maintains an amount of service units in an account of an IMS user. The rating function determines the cost of service usage according to a tariff defined by the network operator. The online charging function utilizes the ABMF and the rating function in order to perform online charging.

Additional network/service elements in the IMS network in one embodiment, not shown in FIG. 1, such as a Proxy-Call Session Control Function ("P-CSCF"), a Session-Call Session Control Function ("S-CSCF"), and an application server ("AS"), include Charging Trigger Functions ("CTF"). These CTFs are adapted to monitor service usage and to generate charging messages responsive to charging events. The CTFs then transmit the charging messages to OCS 102 to provide online charging for the service usage.

Online charging may be performed as direct debiting or unit reservation. For direct debiting, the online charging function debits the units immediately from the account of the user for an individual transaction. For unit reservation, the online charging function grants a quota of units from the account of the user, and provides the quota of units to the requesting service element. The requesting service element then performs budget control by monitoring service usage and deducting from the quota accordingly. If the quota of units expires, then the service element requests another quota of units, and the process continues. After the service has terminated, the total amount of units to deduct from the user's account is resolved.

For example, the following illustrates an example of charging for a typical session in an IMS network. An IMS user either initiates or is invited to receive a session through the appropriate signaling message, such as a Session Initiation Protocol ("SIP") INVITE message. An S-CSCF is assigned to the IMS user to manage the session, so the signaling message goes through the S-CSCF. Responsive to receiving the signaling message for the IMS user, the S-CSCF contacts a Home Subscriber Server ("HSS") to access the subscriber profile for the IMS user. The subscriber profile, among other things, indicates the level of service subscribed to by the IMS user, any supplementary services subscribed to by the user, etc. The subscriber profile also indicates that the IMS user is a prepaid user. Thus, responsive to the detecting the start of the session, a CTF in the S-CSCF initiates online charging for the session. To initiate online charging, the CTF generates a Diameter Ro Credit Control Request ("CCR") INITIAL message indicating the start of the session, and transmits the CCR INITIAL message to OCS 102.

The online charging function in OCS 102 then processes information in the CCR INITIAL message to identify the IMS user, to determine the media type for the session, etc., and accesses the rating function with this and other information to determine a rating for the session. The online charging function also accesses the ABMF to determine whether the IMS user has a sufficient account balance to initiate the session, and if so, to determine how many service units to grant for the session. The online charging function then generates a Credit Control Answer ("CCA"):INITIAL message, and transmits the CCA:INITIAL message to the S-CSCF. The CCA:INITIAL message indicates that the session is allowed, and also indicates the number of quota granted for the session.

The S-CSCF (or the IMS gateway) receives the CCA: INITIAL message, and performs budget control. For budget control, the S-CSCF identifies the quota of service units, and decrements the quota as the session continues. If the CTF in the S-CSCF identifies another charging event, then the S-CSCF generates a CCR:UPDATE message. For example, a charging event may include receiving a SIP 200 OK message acknowledging a SIP INVITE, a RE-INVITE, or an UPDATE message, may include the expiration of the quota of service units, may include the expiration of a validity timer, etc. The S-CSCF transmits the CCR:UPDATE message to OCS 102. The online charging function performs similar processes to grant another quota of service units (if available) for the session, generates a CCA:UPDATE message, and transmits the CCA:UPDATE message to the S-CSCF. The CCA:UPDATE message indicates that the session is allowed to continue, and also indicates the additional quota of service units granted for the session.

The S-CSCF (or the IMS gateway) receives the CCA: UPDATE message, and again performs budget control on the newly granted quota. Assume at some later time that the session ends. Responsive to identifying the end of the session, the CTF in the S-CSCF generates a CCR:TERMINATION message, and transmits the CCR TERMINATION message to the OCS. The CCR:TERMINATION message indicates the number of service units used for the session (either for duration of the session or for the latest slice of the quota granted by the online charging function). The online charging function then resolves the total debit for the session from the account of the IMS user in the ABMF.

BRM 101, such as the BRM product from Oracle Corp., allows the network operator to set up services, using optional components such as the Global System for Mobile Communications ("GSM") Manager and Remote Authentication Dial-In User Service ("RADIUS") Manager to capture data about service usage (e.g., the number of hours in a customer's data session or length of a telephone call). Using BRM 101, the network operator can also define a price list to define how much to charge for the services. For example, a network operator can charge for wireless phone service or Internet access usage, monthly subscription fees, and setup fees.

BRM 101 further is used for registering customers, such as having the customers call a customer service representative or by using a Web page. A customer typically signs up for one or more services, such as Internet access and email. Customer account data, such as telephone numbers, Internet service logins, and billing information, is stored in a BRM database.

BRM 101 further is used to managing customers. When customer account information changes (for example, if a customer changes its credit card), customer management tools are used to update account information or Web pages can be provided for customers to manage their own account.

BRM 101 further is used for authenticating and authorizing customer logins. For example, for services where usage can be tracked in real time, BRM 101 uses customer data stored in the BRM database to authenticate the customer's identity and to verify the customer's authorization to use that service.

BRM 101 further is used for rating service usage, by measuring service usage and rating it (e.g., 10 cents per minute for a wireless call). The charge is added to the customer's account balance.

In one embodiment, an interface between BRM 101 and OCS 102 and other network elements of network 100 is controlled by an "Communications Online Mediation Controller" from Oracle Corp. It provides high-speed translation of the network messages from Diameter Ro or RADIUS protocols to the internal BRM communication protocol, which then performs the processes of authorization, authentication, event rating, and account balance updates. The Communications Online Mediation Controller has a native integration to BRM 101 in one embodiment, so that it establishes connections with BRM 101 and makes use of these connections to invoke BRM internal processes.

Figure 2:
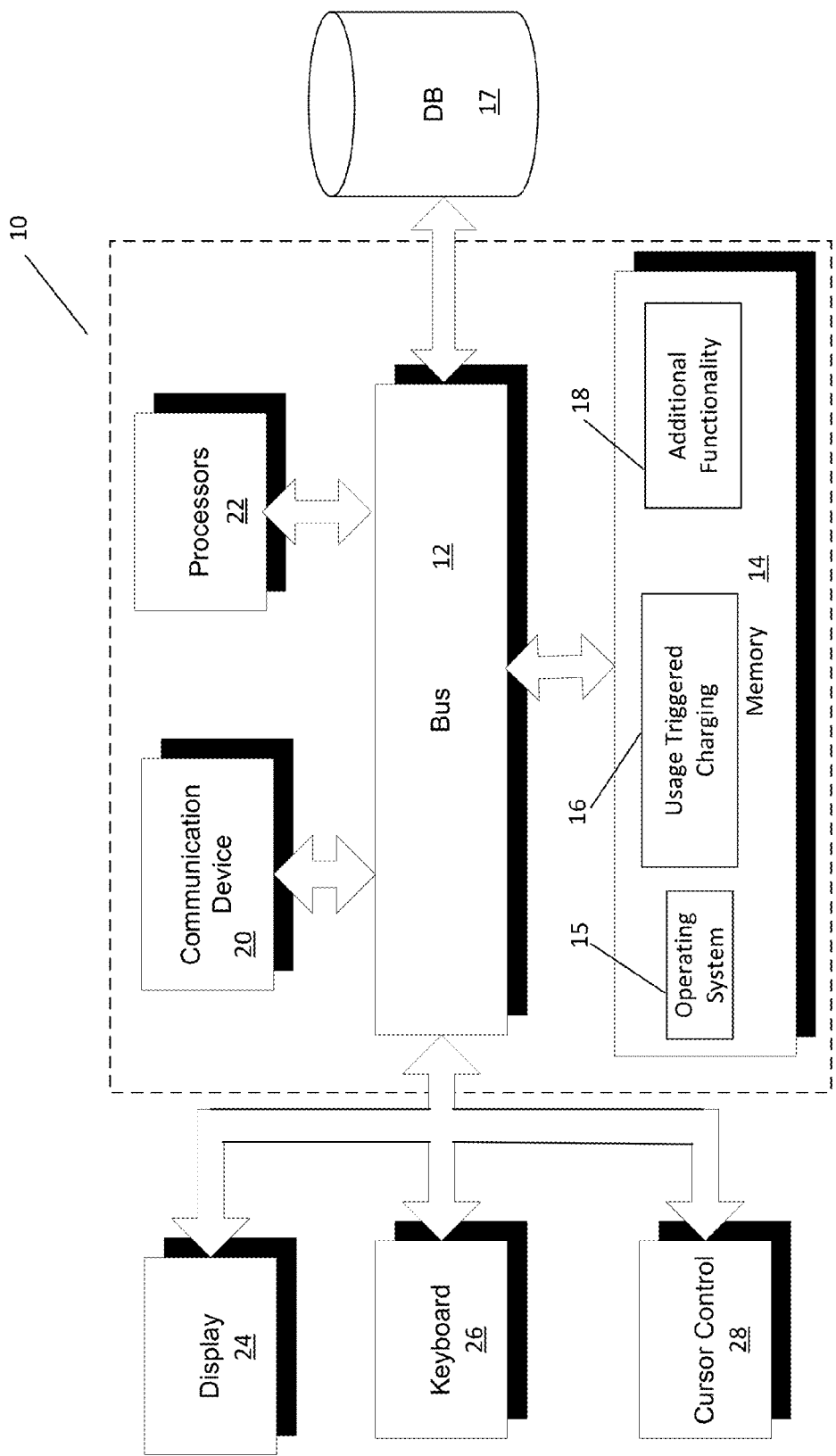
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of OCS 102, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a usage triggered charging module 16 for online charging that is triggered by usage, and all other functionality disclosed herein. System 10 can be part of a larger system, such as added functionality to the "Oracle Communications Elastic Charging Engine" from Oracle Corp. Therefore, system 10 can include one or more additional functional modules 18 to include the additional functionality. A database 17 is coupled to bus 12 to provide centralized storage for modules 16 and 18.

As discussed, telecommunications service providers are increasingly interested in offering subscription periods that are significantly shorter than a month in order to better manage subscriber spending patterns and to address a customer segment that might not be able to afford paying a month at a time. Currently, in reference to FIG. 1, prior art systems require batch processing between BRM 101 and OCS 102 in order to authorize a new or revised allowance for a subscriber. If done on a monthly basis, as is typical, the overhead to network 100 is reasonable. However, if done more frequently, such as on a daily basis for every subscriber of the service provider, the incurred overhead can be a large impediment to offering daily allowance grants. Running a batch process that goes through every account on a daily or even hourly basis can be extremely intensive and require a large amount of computer processing capacity. The batch process generally cycles through all of the accounts to find any that require processing and then processes the cycle charges and grants relevant allowances.

Known industry solutions typically have required service providers to implement complex configurations and customizations to support non-standard short recurring cycles. Further, by granting allowances to all users in a batch process, allowances will be granted without any knowledge that a particular subscriber will use the service.

In contrast, embodiments support allowances and/or charges over configuration periods without dependency on batch processing from BRM 101. The allowances/grants are triggered by a subscriber's use of the service rather than by a batch process using BRM 101 in a "just-in-time" manner. For example, if a subscriber sends an SMS text and this is the subscriber's first usage of the day of network 100, OCS 102 grants the configured allowance of SMS texts and charges for the allowance. The subscriber can then continue using the service for the remainder of the day. However, if there is no usage on a particular day, there is no allowance granted, and no charges are applied.

In one embodiment, the service provider creates a "daily bundle" feature/configuration that enables the granting of allowances (e.g., free voice minutes, data megabytes, SMS texts, etc.) when triggered by a subscriber's service usage, rather than by running a daily batch process. Although the daily bundle configuration is based on a daily (i.e., every day) utilization, other embodiments may use other timeframes (e.g., hourly, weekly, etc.). The created features can generically be referred to as "usage triggered" configuration or "configured offerings".

Figure 3:
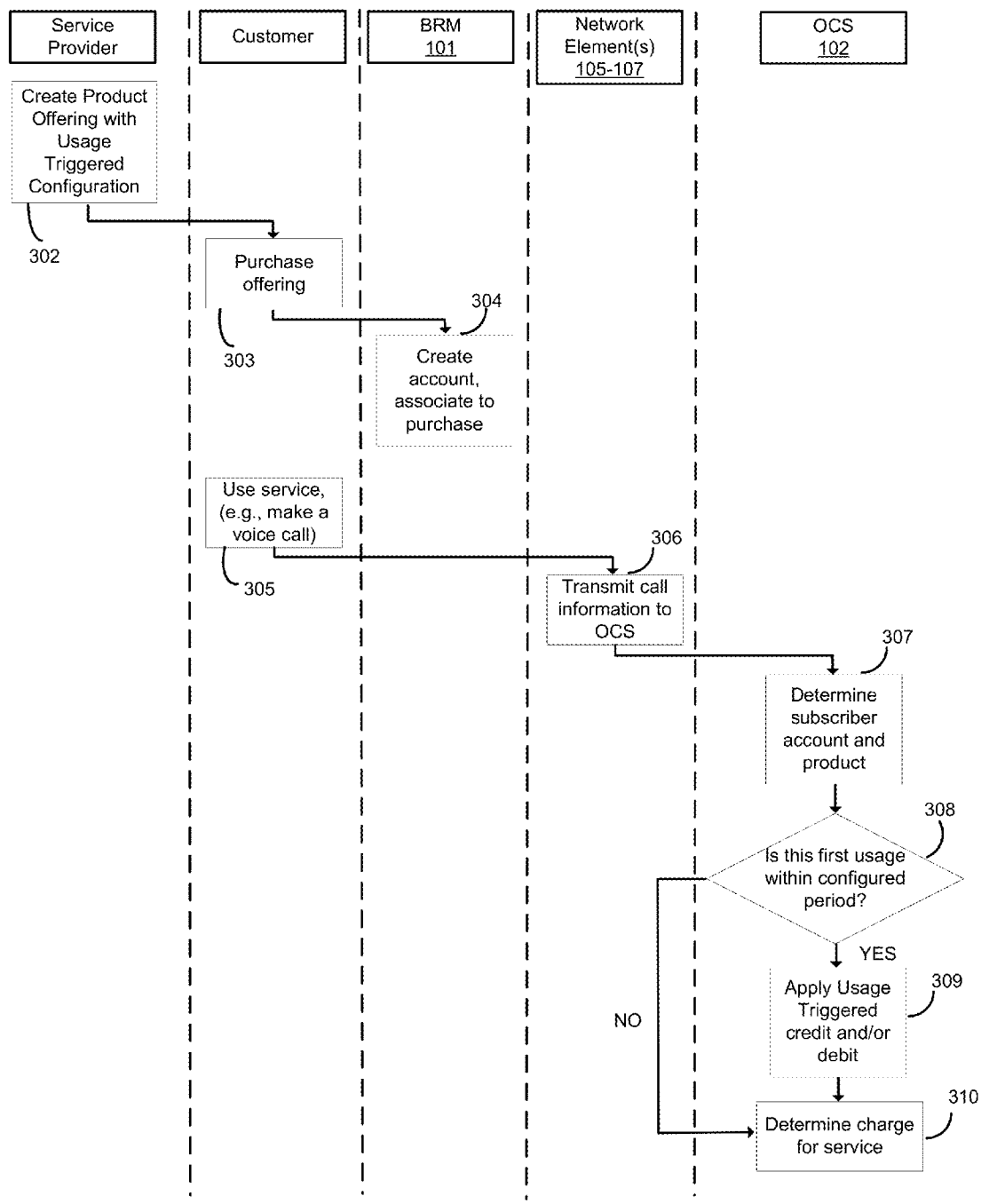
FIG. 3 is a call flow of a usage triggered feature, including a daily bundle feature, in accordance with embodiments of the present invention.

FIG. 3 is a call flow of a usage triggered configuration, including a daily bundle configuration, in accordance with embodiments of the present invention. Portions of the functionality of FIG. 3 may be performed by the service provider, the subscriber/customer, BRM 101, OCS 102, and/or the network elements that enable the subscriber to utilize network 100 and that generates traffic on network 100, such as elements 105-107 of FIG. 1.

Figure 4:
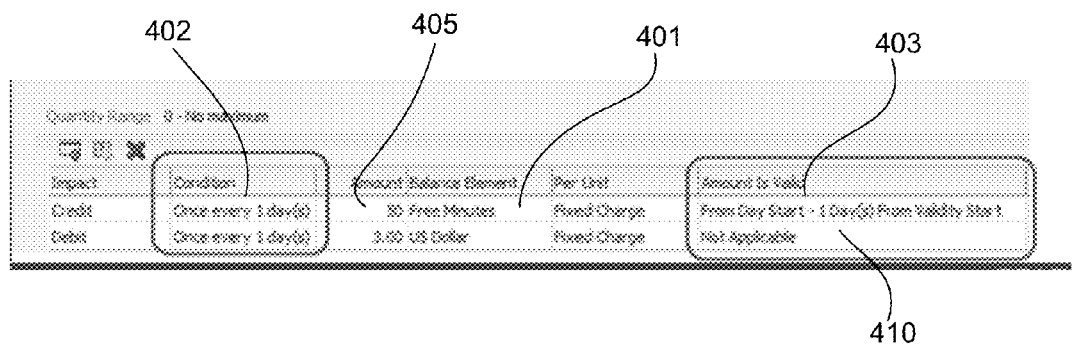
FIG. 4 illustrates an example user interface that allows the service provider to create a usage triggered feature configuration in accordance with one embodiment.

At 302, the service provider creates a configuration for a product offering that includes a daily bundle configuration or any other usage triggered configuration. The configuration in one embodiment includes both a credit and a debit for each configuration. The pricing configuration specifies the time period length within which a grant or charge can happen one time (i.e., the "configured time period"), and the validity of the grant itself. FIG. 4 illustrates an example user interface that allows the service provider to create a usage triggered feature configuration in accordance with one embodiment. As shown in the example of FIG. 4, for the credit, a grant of 50 (405) free minutes (401) can happen once a day (402) and the validity of the free minutes is one day (403). Since the minutes are free, the amount of debit/charge is not applicable (410). In one embodiment, the user interfaces such as in FIG. 4 to create configurations is part of BRM 101 at design time, and triggered in OCS 102 at runtime.

At 303, the subscriber "purchases" the product offering. For a free product offering, there would be no purchase that includes and exchange of funds.

At 304, BRM 101 creates the subscriber's account, or an existing account is used, and that account is associated with the product offering that was purchased.

At 305, at some point the subscriber uses the service that is the subject of the product offering. For example, if the product offering is free voice minutes, the subscriber will use the service when a voice call is initiated by the subscriber. For other product offerings, the service may be sending a text message, using data, etc.

At 306, the network elements that connect the subscriber to the network transmits the voice call information or other service information to OCS 102.

At 307, OCS 102 determines the subscriber account and the product offering that should be used to charge for the call or other service. In one embodiment, the determination of the subscriber account is done based on the public user identity (typically the phone number or MSISDN in the case of mobile services). The product offering is determined by what offerings the subscriber has subscribed to (each of which has a service associated) and the service which is being requested by the network element.

At 308, OCS 102 determines if this is the first usage within the configured time period (e.g., the current day). If yes at 308, at 309 the usage triggered credit and/or debit is applied (e.g., 50 free minutes are granted for the example of FIG. 4). If no at 308, or after 309, at 310 the charge for the call/service is determined.

In the example of FIG. 4, because the credit for the subscriber is free minutes, the subscriber is eligible to talk for 50 minutes without charge. For the first call of the day, referring to FIG. 3 at 309, the 50 free minutes are granted by OCS 102, without batch processing or other input from BRM 101. When the subscriber makes another voice call within the same calendar day, OCS 102 will determine that the daily allowance has already been granted and will not grant the allowance again (e.g., NO at 308 of FIG. 3). OCS 102 will then proceed to determine the charge for the call/service.

Figure 5:
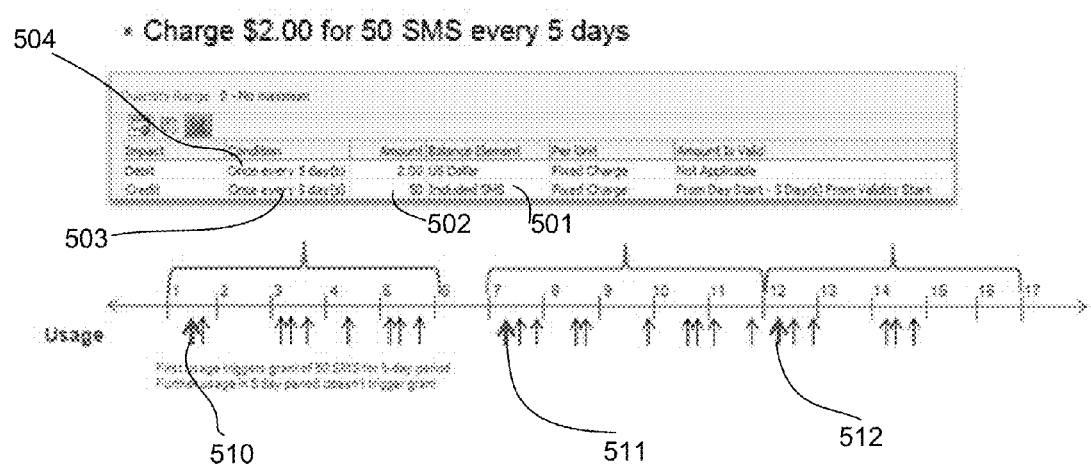
FIG. 5 illustrates an example user interface for configuring the granting/credit of an allowance in accordance with one embodiment.

As disclosed, the time period for granting credits/allowances or for charging/debits can be daily, or can be different time periods such as hourly or across multiple days. FIG. 5 illustrates an example user interface for configuring the granting/credit of an allowance of 50 SMS texts (501, 502) every five days (503) for a charge/debit of $2.00 (504) in accordance with one embodiment. As shown in an example usage timeline, the first usage grant occurs during day 1 (510), and further usage during the 5 day period does not trigger additional grants. Instead, additional grants are triggered during day 7 (511) and during day 12 (512).

Embodiments also allow a service provider to charge a fixed amount for a service that is used once per day, or once per any other time period. FIG. 6 illustrates an example user interface for charging a fixed amount of $5.00 (601) for unlimited usage in accordance with one embodiment. In the example of FIG. 6, the charge is applied when the first usage happens every day, with unlimited usage the rest of the day. There is no charge on a day when there is no usage.

As disclosed, embodiments allow a service provider to define a recurring time period as any number of days. Embodiments further allow a service provider to define the start of a "day" as either the start of calendar day, the time that the first usage event occurred, or the time corresponding to when the offer was first active.

As disclosed, embodiments allow grants of allowances to be triggered by a subscriber using the service as opposed to in response to batch processing at a fixed time period from the BRM. Therefore, embodiments disperse the granting throughout the day, thus reducing the peak period load of the entire telecommunications network, and eliminating the performance impact and dependency on the BRM. Further, embodiments prevent revenue leakage for the service provider and provide spending control for the subscriber. Embodiments further provide a user interface and other structure to allow a service provider to flexibly configure the user triggered features.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to process charging on a telecommunications network, the processing comprising:
   receiving an indication of usage of a telecommunications service by a subscriber;
   in response to the indication, determining a configured offering for the service, the configured offering comprising the telecommunications service, a time period, and at least one of a credit or debit;
   determining if the usage of the telecommunications service is a first usage of the telecommunications service by the subscriber within the time period;
   when the usage is the first usage, applying the at least one of credit or debit; and
   determining a charge for the usage based on the at least one of credit or debit;
   wherein when the usage is not the first usage within the time period, not applying the at least one of credit or debit.

2. The non-transitory computer-readable medium of claim 1, wherein the time period is daily.

3. The non-transitory computer-readable medium of claim 1, wherein the telecommunications network comprises an online charging system, and the processing is implemented by the online charging system.

4. The non-transitory computer-readable medium of claim 1, wherein the charge is zero based on applying at least one of credit or debit.

5. The non-transitory computer-readable medium of claim 1, wherein the telecommunications service comprises voice calling and the credit comprises a number of voice minutes.

6. The non-transitory computer-readable medium of claim 1, wherein the telecommunications service comprises text messaging and the credit comprises a number of texts.

7. The non-transitory computer-readable medium of claim 1, wherein the telecommunications service comprises data usage and the credit comprises a number of bytes of data.

8. A method of charging on a communications network, the method comprising:
   receiving an indication of usage of a communications service by a subscriber;
   in response to the indication, determining a configured offering for the service, the configured offering comprising the telecommunications service, a time period, and at least one of a credit or debit;
   determining if the usage of the telecommunications service is a first usage of the telecommunications service by the subscriber within the time period;
   when the usage is the first usage, applying the at least one of credit or debit; and determining a charge for the usage based on the at least one of credit or debit;

wherein when the usage is not the first usage within the time period, not applying the at least one of credit or debit.

9. The method of claim 8, wherein the time period is daily.

10. The method of claim 8, wherein the communications network comprises an online charging system, and the processing is implemented by the online charging system.

11. The method of claim 8, wherein the charge is zero based on applying at least one of credit or debit.

12. The method of claim 8, wherein the telecommunications service comprises voice calling and the credit comprises a number of voice minutes.

13. The method of claim 8, wherein the telecommunications service comprises text messaging and the credit comprises a number of texts.

14. The method of claim 8, wherein the telecommunications service comprises data usage and the credit comprises a number of bytes of data.

15. An Online Charging System (OCS) comprising:
   a processor; and
   a storage device coupled to the processor and storing a module that causes the processor to charge for a communications service comprising:

receiving an indication of usage of the communications service by a subscriber;

in response to the indication, determining a configured offering for the service, the configured offering comprising the telecommunications service, a time period, and at least one of a credit or debit;

determining if the usage of the telecommunications service is a first usage of the telecommunications service by the subscriber within the time period;

when the usage is the first usage, applying the at least one of credit or debit; and determining a charge for the usage based on the at least one of credit or debit;

wherein when the usage is not the first usage within the time period, not applying the at least one of credit or debit.

16. The OCS of claim 15, wherein the charge is zero based on applying at least one of credit or debit.

17. The OCS of claim 15, wherein the credit comprises at least one of a number of voice minutes, a number of texts or a number of bytes of data.

\* \* \* \* \*